Patented Feb. 9, 1943

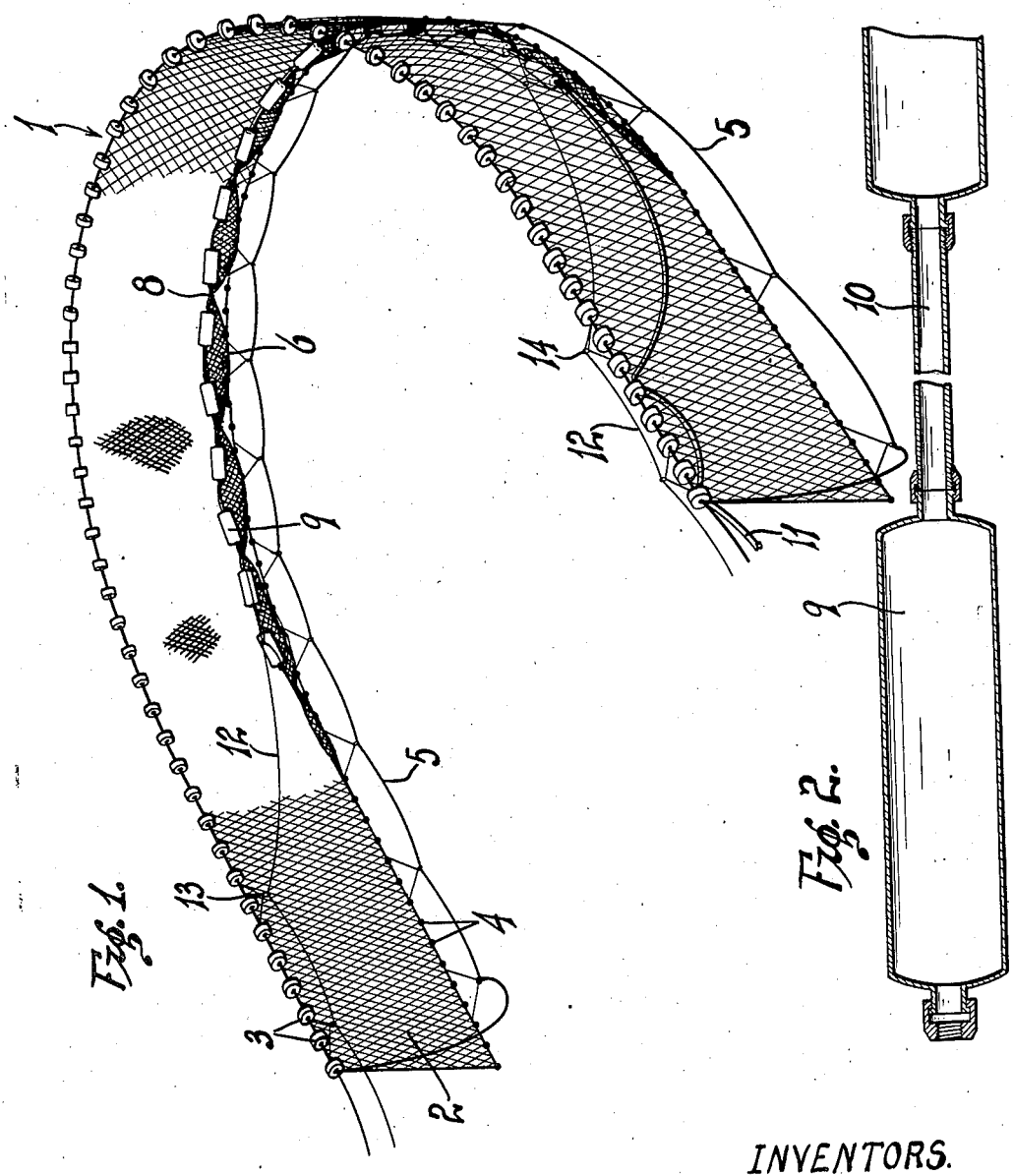

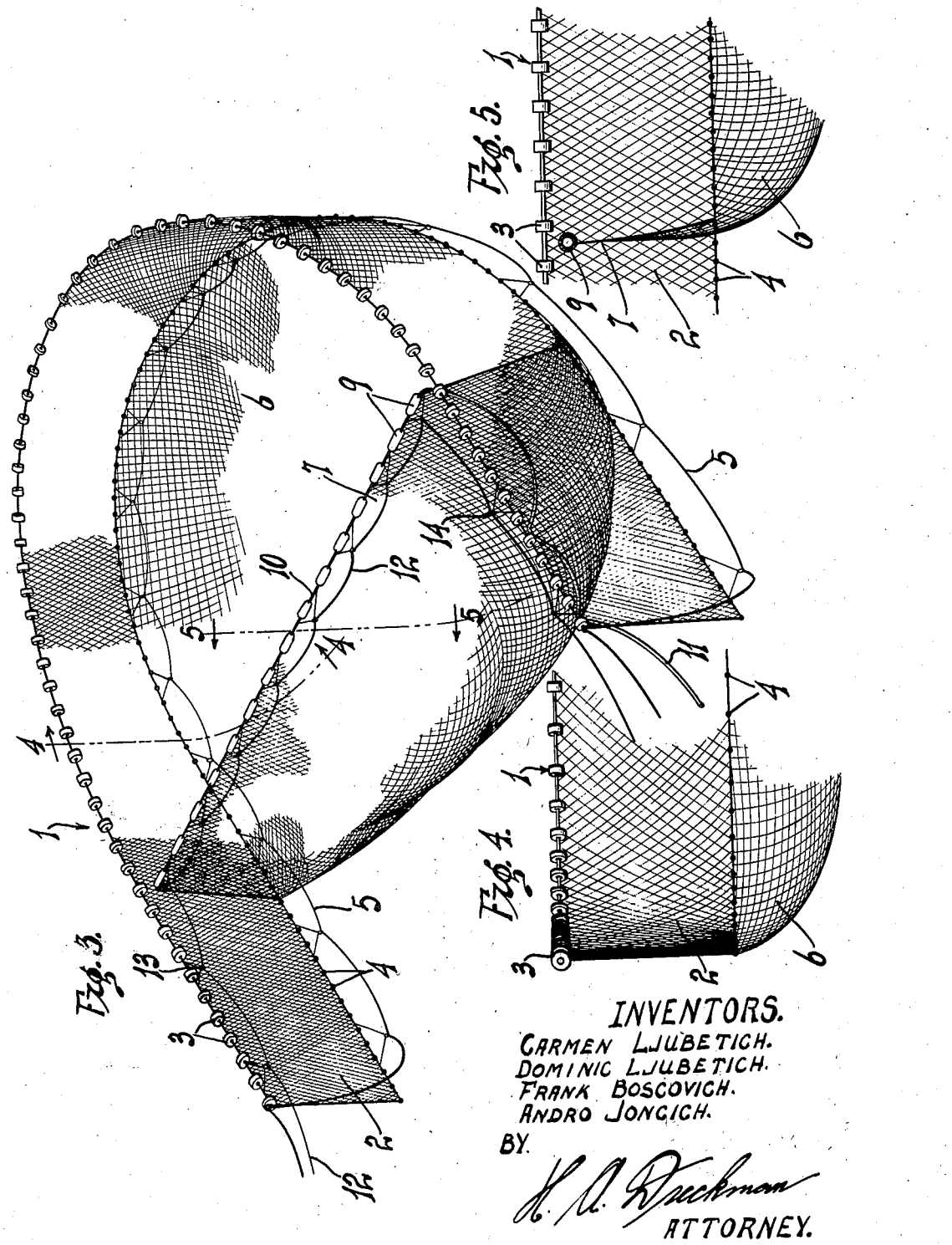

2,310,702

UNITED STATES PATENT OFFICE 2,310,702

PURSE SEINE

Carmen Ljubetich, Dominic Ljubetich, and Frank Boskovich, San Pedro, Calif., and Andro Joncich, Everett, Wash.

Application June 11, 1940, Serial No. 339,900

6 Claims. (Cl. 43—14)

This invention relates to an improvement in purse seines and particularly a means of enclosing the bottom of the seine to prevent fish from moving under the vertical net portion of the seine.

An object of our invention is to provide a novel improved purse seine, including a floor net which is releasable and movable into operative position after the seine has been placed in the water.

Another object of our invention is to provide a novel purse seine, including a floor net, one edge of which is supported on inflatable floats after the seine has been placed in the water.

Still another object is to provide a novel purse seine of the character stated, which can be spread and retrieved in the same manner as nets heretofore in use.

A feature of our invention resides in the novel inflatable floats which are attached to one edge of the floor net, and which are released and inflated to act as floats after the net has been placed in the water.

Other objects, advantages and features of invention may appear from the accompanying drawings, the subjoined detailed description, and the appended claims.

In the drawings:

Figure 1 is a perspective view of our net in operative position, and with the floor net furled and attached to the wall net.

Figure 2 is a fragmentary, longitudinal, sectional view of the inflatable floats.

Figure 3 is a perspective view of our purse seine in extended position, and with the floor net released.

Figure 4 is a sectional view taken on line 4—4 of Figure 3.

Figure 5 is a sectional view taken on line 5—5 of Figure 3.

Referring more particularly to the drawings, the numeral 1 indicates a purse seine which includes a wall net 2, to the upper edge of which a plurality of spaced floats 3 are attached. Weights 4 are secured to the lower edge of the wall net so that the wall net will hang substantially vertical in the water. A draw line 5 extends around the lower edge of the wall net 2 for the purpose of contracting or pursing the net. All of this is usual and well-known in the art.

Fishermen have discovered that when a purse seine is placed in the water around a school of fish, that many of the fish coming in contact with the vertical wall net will move downwardly in the water, and pass under the seine, and thus will not be caught. To prevent the fish from moving under the seine, we have provided a floor net 6.

This floor net is attached to the wall net 2, and preferably adjacent the lower edge of the wall net. The forward edge 7 of the floor net is free, and is caused to rise to the surface of the water after the seine has been placed in the water, as will be subsequently described.

When the seine 1 is first placed in the water, the floor net 6 is furled as shown in Figure 1, and is attached to the wall net 2 by means of light string, which can be easily broken. The attaching strings 8 are passed around the floor net 6, and through the strands of the wall net 2, thus holding the floor net in furled position adjacent the lower edge of the wall net while the seine is being placed in the water. At the top of the forward edge 7 of the floor net 6, we provide a plurality of spaced inflatable floats 9. These floats are suitably secured to the top of the forward edge 7 by means of ropes or other suitable fastening means. The floats 9 are preferably formed of rubber or some other suitable flexible material, and when the seine is first placed in the water, these floats are all exhausted of air, and are collapsed so that they have little or no buoyancy. A tube 10 connects each pair of adjacent floats 9, and a hose 11 extends from the ship to one end of the string of floats 9. Thus, when the seine has been placed in the water, air under pressure can be forced under the ship through the pipe 11, and thence to each of the floats 9, inflating the floats and making them buoyant. A releasing line 12 extends along the forward edge 7 of the floor net, and thence through guide rings 13 and 14 at the top of the wall net 2. This releasing line extends to the ship or the fishing boat, and when pulled upon will break the furling cords 8 to release the floor net 6. After the floor net has been released from its furled position, the pump on the fishing boat inflates the floats 9, and the forward edge of the floor net is then pulled to the position shown in Figure 3. The floats 9 will naturally pull the forward edge of the floor net to the surface, and the school of fish will thus be trapped within the area between the floor net and the wall net 2. The seine can then be pursed in the usual manner by means of the pursing line 5, and the net can be pulled aboard the fishing boat and the fish collected in the usual manner.

Having described our invention, we claim:

1. A purse seine including a wall net, a floor net extending transversely of the seine and adjacent the lower edge of the wall net, and float means mounted on the forward edge of the floor net, said float means being inflatable, and a hose extending to one of said float means, and a tube connecting adjacent float means.

2. A purse seine including a wall net, a floor net, said floor net extending transversely of the seine adjacent the lower edge of the wall net, spaced floats mounted on the forward edge of the floor net, said floats including inflatable sections, a tube connecting adjacent inflatable sections, and an air conduit extending to one end of the spaced floats.

3. A purse seine including a wall net, a floor net, said floor net extending transversely of the seine adjacent the lower edge of the wall net, spaced floats mounted on the forward edge of the floor net, said floor net being initially furled on the wall net adjacent the lower edge of the wall net, said floats including inflatable sections, a tube connecting adjacent inflatable sections, an air conduit extending to one end of the spaced floats, and a control line mounted on the front edge of the floor net whereby the floor net may be released from the furled position and pulled into operative position.

4. A purse seine including a wall net, a floor net extending transversely of the seine and adjacent the lower edge of the wall net, the forward edge of said floor net being free of the wall net, a plurality of spaced float means mounted on the upper portion of the forward edge of the floor net, and a control line mounted on the forward edge of the floor net.

5. A purse seine including a long vertical wall net, floats on the upper edge of the wall net, weights on the lower edge of the wall net, a floor net extending transversely of the seine, and adjacent the lower edge of the wall net, said floor net being initially furled at the lower edge of the wall net, the forward edge of said floor net being free of the wall net, float means on the upper portion of the forward edge of the floor net, and means to release the floor net from furled position.

6. A purse seine including a long vertical wall net, floats on the upper edge of the wall net, weights on the lower edge of the wall net, a floor net extending transversely of the seine, and adjacent the lower edge of the wall net, said floor net being initially furled at the lower edge of the wall net, the forward edge of said floor net being free of the wall net, float means on the upper portion of the forward edge of the floor net, and a control line mounted on the upper edge of the free portion of the floor net whereby the floor net may be released from furled position, and pulled into operative position.

CARMEN LJUBETICH.
DOMINIC LJUBETICH.
FRANK BOSKOVICH.
ANDRO JONCICH.